United States Patent [19]

Belart

[11] 3,827,759

[45] Aug. 6, 1974

[54] ANTISKID BRAKE SYSTEM WITH POWER ASSISTANCE

[75] Inventor: Juan Belart, Walldord, Germany

[73] Assignee: ITT Industries, Inc., New York, N.Y.

[22] Filed: Jan. 16, 1973

[21] Appl. No.: 324,049

[30] Foreign Application Priority Data
Jan. 22, 1972  Germany............................ 2202998

[52] U.S. Cl................... 303/21 F, 60/403, 60/582, 188/181 A, 303/21 AF
[51] Int. Cl............................................... B60t 8/12
[58] Field of Search.......... 303/21 F, 21 AF, 61–63, 303/68–69, 9; 188/181 A, 345; 60/403, 404, 405, 582

[56] References Cited
UNITED STATES PATENTS

| | | | |
|---|---|---|---|
| 3,401,982 | 9/1968 | Walker et al...................... | 303/21 F |
| 3,606,488 | 9/1971 | Beuchle et al..................... | 303/21 F |
| 3,669,509 | 6/1972 | Jones................................. | 303/21 F |
| 3,729,235 | 4/1973 | Bach et al. ........................ | 303/21 F |

*Primary Examiner*—Duane A. Reger
*Assistant Examiner*—D. C. Butler
*Attorney, Agent, or Firm*—John T. O'Halloran; Menotti J. Lombardi, Jr.; Alfred C. Hill

[57] ABSTRACT

A power assisted brake system for a vehicle equipped with an antiskid system. The brake system includes a driver actuated control valve to switch on the assist power and a safety device which enables a certain braking power in case of failure of the assist power. The antiskid hydraulic control valves control the pressure in the hydraulic assist power connection. The safety device includes a hydraulic emergency connection completely separate from the hydraulic assist power connection. This hydraulic emergency connection enables the elimination of the strong emergency spring employed in prior art arrangements. Two embodiments are disclosed.

12 Claims, 2 Drawing Figures

ANTISKID BRAKE SYSTEM WITH POWER ASSISTANCE

BACKGROUND OF THE INVENTION

The invention relates to an antiskid brake system with power assistance having a control valve to switch on the assist power and a safety device which maintains a certain brake power in case of a failure of the power assistance.

Brake systems with power assistance are known. When actuating the brake pedal, a power assistance is switched on by means of a control valve which works in the sense of the pedal force and produces the main share of the braking force. The systems are equipped with a safety device in a way such that in case of a failure of the power assistance, which is taken from a pump rotation or an accumulator, it is possible to apply the wheel brakes with the pedal force only.

The tendency to equip brake systems with an antiskid system in order to avoid locking of one or more wheels and prolongation of the brake travel, or to prevent skidding of the vehicle is widespread.

Besides the primary elements to determine the state of movement of the wheels and a regulation unit to transform the measuring signals and to produce actuating signals, the already known method of preventing locking by expansion of volume requires a final control element which is integrated into the brake lines and which is influenced by the actuating signals of the regulation unit to hydraulically separate wheel brake cylinder and master cylinder in case of locking danger, to produce an expansion of volume in the section connected with the wheel brake cylinder, and, of course, to reestablish the initial state when the locking danger has passed. This final control element includes, for instance, a plunger piston kept in its original position by means of a spring force. The piston is actuated by a pressure source through valves actuated by a regulation unit. The piston is moved against this spring force. The final control element also includes a separation valve to disconnect the brake line. The antiskid device requires considerable installation room particularly because of the necessity of a safety device in case of a failure of the pressure source and an additional pressure source.

SUMMARY OF THE INVENTION

An object of the present invention is to provide a brake system with power assistance which can easily to equipped with an antiskid device by using only a few additional components.

Another object of the present invention is that the antiskid brake system of the present invention is reliable in operation, space-saving, and economical in production.

In accordance with a feature of the present invention these objects can be achieved by a hydraulic emergency brake connection completely separated from the hydraulic connection containing the assist pressure with the antiskid control valve being disposed for regulation of only the pressure in the hydraulic connection containing the assist pressure can be influenced.

Another feature of the present invention is the provision of an antiskid brake system with power assistance comprising: a source of assist power; at least one wheel brake cylinder; at least one activating cylinder having one end thereof connected to the wheel brake cylinder; a master cylinder connected to the source, the master cylinder including a driver actuated control valve to connect assist power to one end of the master cylinder; a first hydraulic connection connected to the one end of the master cylinder and to the other end of the activating cylinder to supply assist power to the activating cylinder upon actuation of the control valve to actuate the wheel brake with the assist power; a second hydraulic connection connected to the other end of the master cylinder and to the activating cylinder spaced from the other end of the activating cylinder to enable a driver to supply brake power to the activating cylinder to activate the wheel brake cylinder upon failure of the assist power; and antiskid hydraulic control valves connected to the first hydraulic connection to control the assist power to achieve desired antiskid control.

In accordance with still another feature of the present invention the space before the actuation surface of the master cylinder, in which a control valve is provided to switch on the assistance power, is connected by the above mentioned first hydraulic connection with first space of an actuating cylinder subdivided by a piston, which is sealed against the cylinder wall. The second space of this actuating cylinder is connected, on the one hand, with the cylinder space before the front surface of the piston in the master cylinder through the above mentioned second hydraulic connection of a pressure medium line which can be blocked by means of a pressure-actuated valve and, on the other hand, with the wheel cylinders by means of a further pressure medium line.

In accordance with a further feature of the present invention the pressure-actuated valve can be blocked when actuating the system by means of assist pressure.

In accordance with still a further feature of the present invention antiskid control valves are connected to the above-mentioned first hydraulic connection having three different switching combinations, whereby the antiskid valves are switched according to the state of movement of one or more wheels of the vehicle.

In accordance with another feature of the present invention in the initial position or first switching combination of the antiskid valves the actuating cylinder is hydraulically connected with the above-mentioned first hydraulic connection. In the second switching combination of the antiskid valves the above-mentioned first hydraulic connection is disconnected from the actuating cylinder and in the third switching combination of the antiskid valves the actuating cylinder is connected with a reflux reservoir. In accordance with one embodiment of the present invention two actuating cylinders are connected to a different one of the wheel brake cylinders of each wheel of an axle and in common to the first hydraulic connection. In a second embodiment, a common actuating cylinder is connected between the wheel brake cylinders of the wheels of one axle and the first hydraulic connection.

According to still another feature of the present invention each actuating piston of the first embodiment is held on a stop in a direction opposite to the actuating direction by a spring supported on a collar. The spaces of the actuating cylinders coupled to the pressure medium connections of the wheels of one axle are connected with the interior space of a common transverse cylinder through bores in the cylinder wall. A double T-shaped piston is provided for these later spaces. Each of the double T-shaped pistons is guided through the bores, whereby their surfaces of application are opposite in the transverse piston and the transverse part extending into the space of the actuating cylinder is opposite to the wall connecting bore connected to the above-mentioned second hydraulic connection.

According to a further feature of the present invention the interior space of the transverse cylinder is connected with the first hydraulic connection between the actuation surfaces of the double T-shaped pistons.

In accordance with still a further feature of the present invention the common actuating cylinder of the second embodiment includes a displaceably arranged piston in the actuating cylinder having a recess on the end of the piston adjacent of the wheel brake cylinder connection, the recess being connected with a ring-shaped space between inner surface of the cylinder wall and the outer surface of the piston through connection bores which can be blocked by means of a valve. As far as the ring-shaped space is concerned, it is connected with the above-mentioned second hydraulic connection.

In accordance with still another feature of the present invention the recess of the piston includes therein a valve body which has its seat on the port of one of the connection bores. On the bottom of the actuating cylinder adjacent the connection to the wheel brake cylinders one end of a stem is fixed. A hollow cylinder is secured to the other end of the stem and is protected against sliding down the stem by means of a collar upon which is exerted the force of an expanding spring arranged within the hollow cylinder. The valve body is held on that part of the hollow cylinder which extends into the recess.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
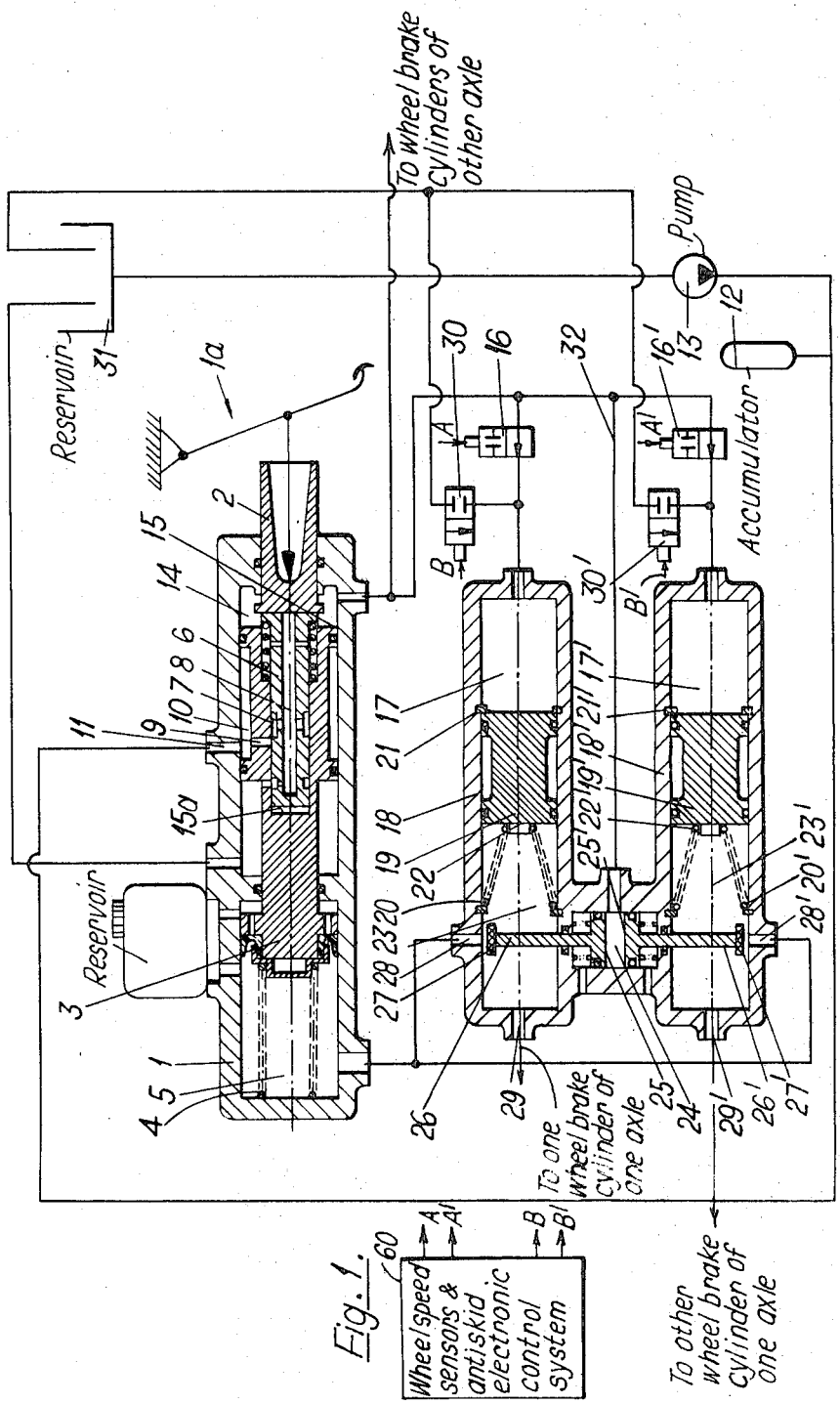
FIG. 1 is a longitudinal cross-sectional view, partially schematic in form, of a first embodiment in accordance with the principles of the present invention.

According to FIG. 1 a known cylinder 1 is provided in which the assist power is switched on through a push rod 2 by means of the pedal and a piston 3 is displaceable against the force of a spring 4, so that a static pressure can be built up in the cylinder space 5 before piston 3. In the part of the piston 3 facing towards push rod 2 a control valve is provided in known manner through which an assist power is switched on to support the pedal force. In the part of piston 3 facing towards push rod 2, a blind-end bore is provided, in which a valve slide 6 is arranged displaceably to a certain degree against a spring force. A ring-shaped groove 7 in valve slide 6 is connected with a lengthwise bore 8 of slide 6 and is covered by a transverse bore 9 when valve slide 6 is displaced by the pedal force, whereby transverse bore 9 opens into a ring-shaped space 10 between the outer surface of piston 3 and the inner surface of cylinder 1, space 10 being sealed on both sides. Ring-shaped space 10 is always connected with the assist power source, an accumulator 12 and/or a pump 13 through a bore 11 in the cylinder wall. When ring-shaped groove 7 in valve slide 6 is covered by transverse bore 9 in the piston by pressing the pedal, the pressure medium extends from the assist power source through the control valve into space 14 before the surface of application 15, 15a of the piston 3 and displaces it in master cylinder 1.

According to the invention this space 14 is connected with the cylinder space 17 and 17' of two actuating cylinders 18 and 18' through a normally opened inlet valve 16 and 16'. In each of these actuating cylinders 18 and 18', pistons 19 and 19' are displaceably arranged against the cylinder wall and sealed thereto. Pistons 19 and 19' are kept on the stop 21 and 21' in the neutral position of the system through springs 20 and 20' supported on a collar.

The spaces 23 and 23' of actuating cylinders 18 and 18' arranged before the front surfaces 22 and 22' of pistons 19 and 19' are connected to a transverse cylinder 24. The surfaces of application 25 and 25' of two double T-shaped pistons 26 and 26' are opposed in the transverse cylinder and they are tightly guided along cylinder 24 through the cylinder wall of actuating cylinders 18 and 18'. With their transverse parts 27 and 27' in spaces 23 and 23' pistons 26 and 26' extending to the opposite wall of actuating cylinders 18 and 18'. Bores 28 and 28' in the cylinder wall provided at this point is connected through a pressure medium line with cylinder space 5 located in master cylinder 1 before piston 3.

The space between the surfaces of application 25 and 25' of the double T-shaped pistons 26 and 26' in transverse cylinder 24 is connected with space 14 in master cylinder 1 through a pressure medium line 32. On the bottom of actuating cylinders 18 and 18' a pressure medium connection 29 and 29' to the right and left wheel brake of one axle of the vehicle is provided. Furthermore, cylinder spaces 17 and 17' of actuating cylinders 18 and 18' are connected with the reserve reservoir 31 through normally closed outlet valves 30 and 30'. From space 14 of master cylinder 1 a pressure medium line is guided through a similarly installed device to the wheel brakes of the second axle.

The system functions as follows:

In order to stop the vehicle the driver actuates the brake pedal and releases the pressure medium supply from the assist power source, accumulator 12, through a control valve into space 14 before surfaces of application 15 and 15a of the piston 3. While the pressure medium actuates piston 3 in the actuating direction, the assist pressure medium reaches, due to the provided pressure medium connections, the two cylinder spaces 17 and 17' of actuating cylinders 18 and 18' through the two opened inlet valves 16 and 16', on the one hand, and actuates piston 19 and 19' and on the other hand, to transverse cylinder 24 to act on surfaces of application 25 and 25' of the double T-shaped pistons 26 and 26'. The latter are pressed against the opposite seat with their transverse parts 27 and 27' located in spaces 23 and 23', thus, closing the pressure medium connection through bores 28 and 28' to cylinder space 5 of master cylinder 1. By displacing pistons 19 and 19' against springs 20 and 20' pressure is built up in spaces 23 and 23' and through the hydraulic connections 29 and 29' pressure is built up in the wheel brake cylinders of the wheels of this axle.

In case of the danger of locking of one or more wheels, this is detected by wheel speed sensors and antiskid electronic control system 60 and actuating signals are transmitted in a certain sequence to electromagnetic valves 16, 16' and 30, 30'. If only one wheel tends to lock, the inlet valve 16 closes first, for instance, and separates cylinder space 17 of actuating cylinder 18 from space 14 of master cylinder 1 so that no further pressure can be built up. If the outlet valve 30 is the next to be opened, the pressure from cylinder space 17 can release into reserve reservoir 31, and spring 20 will push piston 19 back to a certain degree into its original position so that the pressure in space 23 and in the wheel cylinder is also reduced. The connection between space 23 and cylinder space 5 of master cylinder 1 continues to be closed by the assist pressure due to double T-shaped piston 26. When the state of motion of the wheels has recovered and when the locking danger has passed, outlet valve 30 closes in a way such that the brake pressure cannot continue to fall. Inlet valve 16 then opens so that the assist pressure actuates actuating piston 19 again. By moving piston 19 in the above described manner, the pressure in the wheel cylinder is cyclically reduced and built up until the locking danger has passed, or the vehicle comes to a standstill.

In case of failure of the assist pressure, making the movement of pistons 19 and 19' in the actuating direction impossible and being held on their stops 21 and 21' due to the force of springs 20 and 20', the pressure is released in transverse cylinder 24 which acts on the surfaces of application 25 and 25' of double T-shaped pistons 26 and 26' and thereby connects cylinder space 5 of master cylinder 1 with spaces 23 and 23' of actuating cylinders 18 and 18'. The driver, thus, has the possibility of building up pressure in the wheel cylinders by means of only the pedal force through master cylinder piston 3, cylinder space 5, and spaces 23, and to bring the vehicle to a complete standstill. In spite of failure of the accumulator pressure, the brake system continues to be operable without any antiskid facility.

Figure 2:
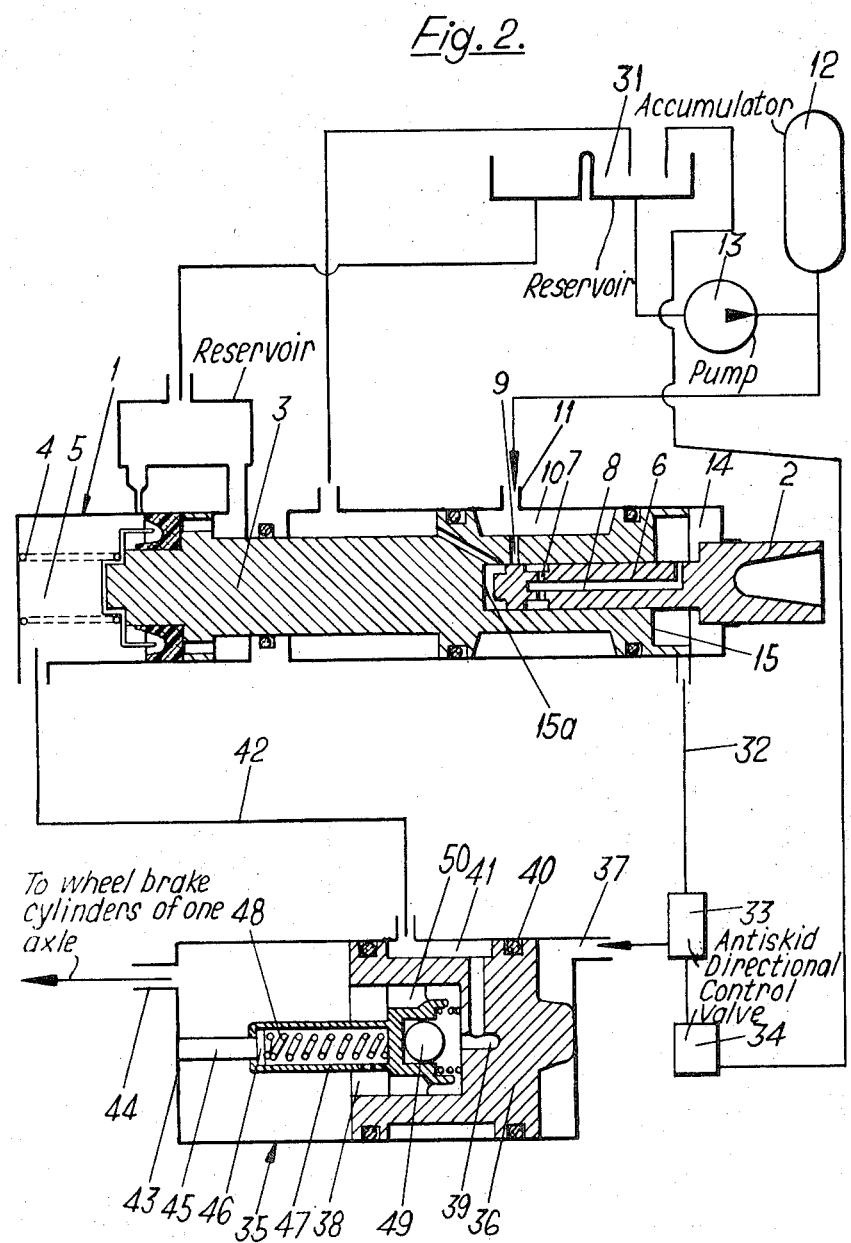
FIG. 2 is a longitudinal cross-sectional view, partially schematic in form, of a second embodiment in accordance with the principles of the present invention.

FIG. 2 show a further embodiment of this invention. Master cylinder 1 is constructed in the same way as in the embodiment of FIG. 1. The same parts are marked with the same reference numerals. From sapce 14, before the surfaces of application 15 and 15a of piston 3, a hydraulic connection line 32 leads into an actuating cylinder 35 through an arrangement of antiskid directional control valves 33 and 34.

The arrangement of directional control valves 33 and 34, preferably operated electro-magnetically, enables in three switching positions either a pressure medium connection between actuating cylinder 35 and space 14 of master cylinder 1, or between actuating cylinder 35 and reflux reservoir 31, or disconnects any pressure medium connection. In actuating cylinder 35 a piston 36 is displaceably arranged against the cylinder wall and sealed thereto. In the end of piston 36 removed from pressure medium inlet 37 there is disposed a concentric recess 38 from which the bores 39 and 40 lead into a sealed ring-shaped space 41 located between the inner surface of the cylinder wall and outer surface of piston 36, ring-shped space 41 being connected with cylinder space 5 of master cylinder 1 through a pressure medium line 42. On the bottom 43 of actuating cylinder 35, from which passes a pressure medium connection 44 to the wheel brake cylinder, a stem 45 is fixed in actuating cylinder 35. On its surface a hollow cylinder 47 is displaceably installed against the force of an expanding spring 48 arranged in this hollow cylinder 47, which is secured by a stop 46 against sliding down. At the end of cylinder 47, which extends into recess 38 of piston 36 and which is possibly guided by ribs 50 on the interior surface of piston 36, a valve body 49, a ball, for instance, is provided, which has its seat in the port of bore 39 departing from recess 38. In the neutral position of the system valve body 49 is lifted from its seat.

An actuating cylinder 35 having the arrangement of directional control valves 33 and 34 can be provided for each wheel or commonly for the wheels of one axle.

The arrangement functions as follows:

In order to stop the vehicle the driver — described above — directs the assist pressure by means of the control valve in master cylinder 1 into actuating cylinder 35 through connection line 32 and the arrangement of directional control valves 33 and 34 being in their original position. The pressure medium actuates piston 36 through connection 37 and displaces piston 36 into actuating cylinder 35, whereby after a short stroke valve body 49 closes on its seat of bore 39 and disconnects the hydraulic connection between the space before the piston 36 and cylinder space 5 of the master cylinder 1, space 5 being under pressure due to the pedal force and the assist pressure. The assist pressure continues to displace piston 36 into actuating cylinder 35 so that pressure is built up in the space located before it and thus in the wheel cylinders through connection 44.

In case of a locking danger of the wheel actuation signals — as described above — first, the pressure medium connection 32 between the master cylinder 1 and the actuating cylinder 35 is disconnected by switching on the arrangement of valves 33 and 34 and then provide a connection between cylinder 35 and reserve reservoir 31. The pressure in the wheel cylinders and in the space before the piston 36 releases by displacing piston 36 in the direction of its original position. When the locking danger has passed, the arrangement of directional control valves 33 and 34 is brought into their original position, and a new pressure is built up. When required this process can be repeated cyclically.

In case of failure of the assist pressure, piston 36 in actuating cylinder 35 cannot be moved out of its original position and no pressure can be built up. For this case of emergency a hydraulic connection exists between cylinder space 5 of the master cylinder 1, ring-shaped space 41 between the adjacent surfaces of actuating cylinder 35 and piston 36, bores 41 and 39 with valve body 49 lifted off its seat and the space before the piston 36. Due to this connection the driver can build up pressure in the wheel cylinders by means of the pedal force and actuate an emergency braking.

Since the emergency hydraulic circuit is completely separated from the actual brake actuation there is no loss of volume in the section of the brake line connected with the wheel brake cylinder even in case of failure of the accumulator force and possible leakages in the seat valve, because the seat valve only controls the connection between the emergency circuit and the wheel brake cylinder.

By means of this invention the arrangement of a strong emergency spring, or an emergency return spring can be avoided. A simple security device enables a reliable emergency braking in case of failure of the assist pressure, or of the accumulator pressure. The system is space-saving and cheap.

While I have described above the principles of my invention in connection with specific apparatus it is to be clearly understood that this description is made only by way of example and not as a limitation to the scope of my invention as set forth in the objects thereof and in the accompanying claims.

I claim:

1. An antiskid brake system with power assistance comprising:
   a source of assist power;
   at least one wheel brake cylinder;
   at least one activating cylinder having one end thereof connected to said wheel brake cylinder;
   a master cylinder connected to said source, said master cylinder including
      a driver actuated control valve to connect assist power to one end of said master cylinder;
   a first hydraulic connection connected to said one end of said master cylinder and the other end of said activating cylinder to supply assist power to said activating cylinder upon actuation of said control valve to actuate said wheel brake with said assist power;
   a second hydraulic connection connected to the other end of said master cylinder and to said activating cylinder spaced from said other end of said activating cylinder to enable a driver to supply brake power to said activating cylinder to activate said wheel brake cylinder upon failure of said assist power; and
   antiskid hydraulic control valves connected to said first hydraulic connection to control said assist power to achieve desired antiskid control.

2. A system according to claim 1, wherein
   said master cylinder includes
      a master cylinder piston disposed coaxial of a first longitudinal axis of said master cylinder;
   said control valve includes
      a driver actuated member disposed coaxial of said first axis and slidably disposed within said master cylinder piston, said member being driver actuated at one end thereof to connect said source to an activating surface of said master cylinder piston adjacent said one end of said driver actuated member;
   said activating cylinder including
      an actuating piston disposed in a slidably sealed relation within said activating cylinder coaxial of a second longitudinal axis of said activating cylinder to divide said actuating piston into a first chamber adjacent said other end of said activating cylinder and a second chamber adjacent said one end of said activating cylinder;
   said first hydraulic connection is connected between said activating surface and said first chamber; and
   said second hydraulic connection is connected between a third chamber in said master cylinder adjacent the end of said master cylinder piston remote from said activating surface and said second chamber; and further including
      a pressure actuated valve disposed in said activating cylinder to block said second hydraulic connection when said assist power is present.

3. A brake system according to claim 2, wherein said pressure activated valve is controlled by said assist power.

4. A brake system according to claim 3, wherein said antiskid valves are controlled by an antiskid control system, said antiskid valves having three different switching combinations.

5. A brake system according to claim 4, further including a reservoir for pressure medium employed in providing said assist power; and
wherein
   said antiskid valves have
      a first switching combination to connect said first chamber to said actuating surface,
      a second switching combination to disconnect said first chamber from said actuating surface, and
      a third switching combination to connect said first chamber to said reservoir.

6. A brake system according to claim 5, wherein said second chamber of said activating cylinder is common to said wheel brake cylinder of each wheel of an axle.

7. A brake system according to claim 6, wherein
said actuating piston includes a recess in the surface thereof adjacent said second chamber,
   a ring-shaped space between the inner wall of said actuating cylinder and the outer wall of said actuating piston,
   a plurality of bores interconnecting said recess and said space, and
   a valve disposed in said recess to block said plurality of bores when said assist power is present; and said second hyraulic connection is connected to said space.

8. A brake system according to claim 7, wherein one of said plurality of bores is coaxial of said second axis, and said valve includes
   a valve body disposed coaxial of said second axis within said recess, and
   a valve seat disposed in the adjacent port of said one of said plurality of bores.

9. A brake system according to claim 8, wherein said valve further includes
   a stem disposed coaxially of said second axis having one end fixed to said one end of said actuating cylinder,
   a hollow cylinder secured to the other end of said stem and extending into said recess, and
   an expanding spring disposed in said hollow cylinder,
   said valve body being disposed on the end of said hollow cylinder extending into said recess.

10. A brake system according to claim 5, wherein there is provided one of said actuating cylinder for each wheel of an axle and both of said actuating cylinders are connected to said first hydraulic connection.

11. A brake system according to claim 10, wherein said actuating piston of each of said actuating cylinders are maintained in its rest position aginast a stop in said first chamber by means of a spring in said second chamber supported by a collar.

12. A brake system according to claim 11, wherein said second chamber of each of said actuating cylinder includes
a transverse bore through the wall of said actuating cylinder, and further including
a common transverse cylinder connected to said first hydraulic connection;
a pair of T-shaped pistons each slidably sealed in said common cylinder and extending in opposite directions into said second chamber of a different one of said actuating cylinders in a slidably sealed relation through the associated one of said transverse bores, each of said T-shaped pistons moving in opposite directions and terminating within said second chamber in a different one of said actuating cylinder in a member that will block said second hydraulic connection.

* * * * *